(12) United States Patent
Revol

(10) Patent No.: US 10,967,551 B2
(45) Date of Patent: Apr. 6, 2021

(54) METHOD FOR MOULDING AN OPTICAL COMPONENT WITH THE COMPONENT BEING DIRECTLY COOLED BY A FLUID

(71) Applicant: VALEO VISION, Bobigny (FR)

(72) Inventor: Damien Revol, Bobigny (FR)

(73) Assignee: VALEO VISION, Bobigny (FR)

( * ) Notice: Subject to any disclaimer, the term of this patent is extended or adjusted under 35 U.S.C. 154(b) by 266 days.

(21) Appl. No.: 16/015,975

(22) Filed: Jun. 22, 2018

(65) Prior Publication Data

US 2018/0370107 A1   Dec. 27, 2018

(30) Foreign Application Priority Data

Jun. 23, 2017   (FR) ..................................... 17 55746

(51) Int. Cl.
| | |
|---|---|
| *B29C 45/73* | (2006.01) |
| *B29D 11/00* | (2006.01) |
| *B29C 33/04* | (2006.01) |
| *B29C 45/04* | (2006.01) |
| *B29C 45/16* | (2006.01) |
| *B29L 11/00* | (2006.01) |

(52) U.S. Cl.
CPC .............. *B29C 45/73* (2013.01); *B29C 33/04* (2013.01); *B29C 45/045* (2013.01); *B29C 45/1628* (2013.01); *B29C 45/7312* (2013.01); *B29D 11/00009* (2013.01); *B29D 11/0048* (2013.01); *B29C 45/16* (2013.01); *B29C 2045/7387* (2013.01); *B29L 2011/0016* (2013.01)

(58) Field of Classification Search
CPC .......... B29D 11/00009; B29D 11/0048; B29C 45/73; B29C 45/7312; B29C 45/045; B29C 45/1628; B29C 33/04
See application file for complete search history.

(56) References Cited

U.S. PATENT DOCUMENTS

| | | | |
|---|---|---|---|
| 5,882,553 A | 3/1999 | Prophet et al. | |
| 2009/0168188 A1* | 7/2009 | Takahashi | B29C 33/046 359/642 |

FOREIGN PATENT DOCUMENTS

| | | |
|---|---|---|
| EP | 0 884 155 A1 | 12/1998 |
| EP | 2 578 376 A1 | 4/2013 |

OTHER PUBLICATIONS

French Preliminary Search Report dated Jan. 23, 2018 in French Application 17 55746, filed on Jun. 23, 2017 (with English Translation of Categories of cited documents).

* cited by examiner

*Primary Examiner* — Mathieu D Vargot

(74) *Attorney, Agent, or Firm* — Oblon, McClelland, Maier & Neustadt, L.L.P.

(57) ABSTRACT

A method for moulding an optical component by a mould, at least one moulding station, and at least one cooling station including a cooling space, the method including: a step of moulding a moulded component in a moulding station, a step of transferring this component from this moulding station into the cooling space, keeping the moulded component facing at least one of the mould parts, a step of cooling the moulded component by sending a cooling fluid between the moulded component and the walls of the cooling space, the moulded component being kept some distance from these walls.

14 Claims, 10 Drawing Sheets

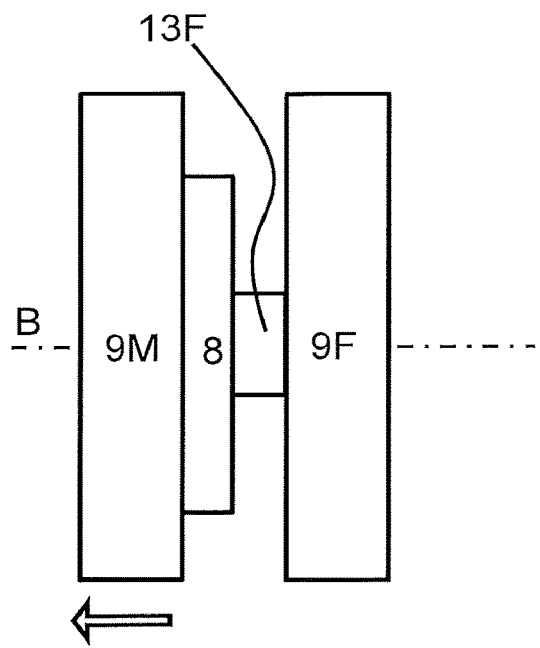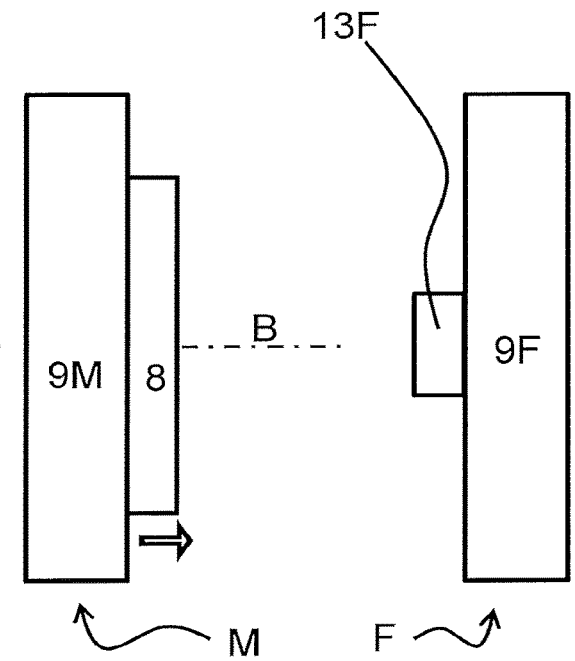
Fig. 20a    Fig. 20b
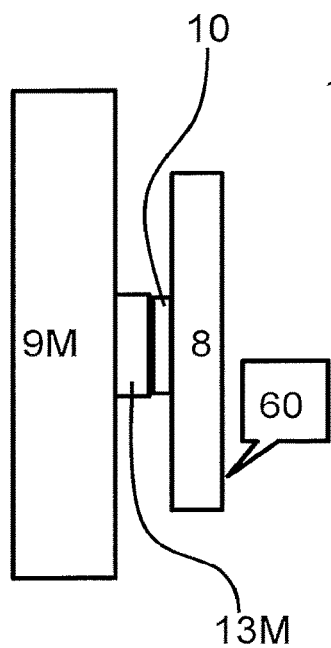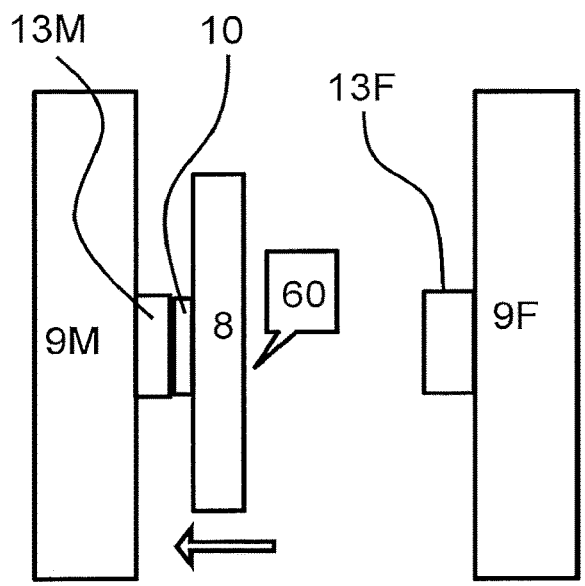
Fig. 20c    Fig. 20d

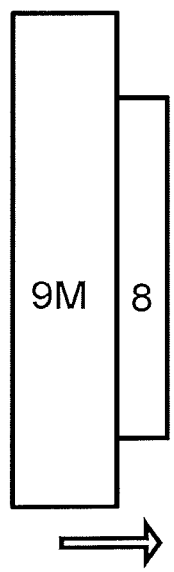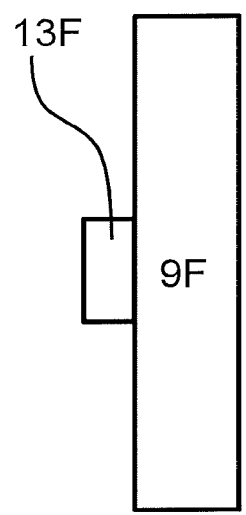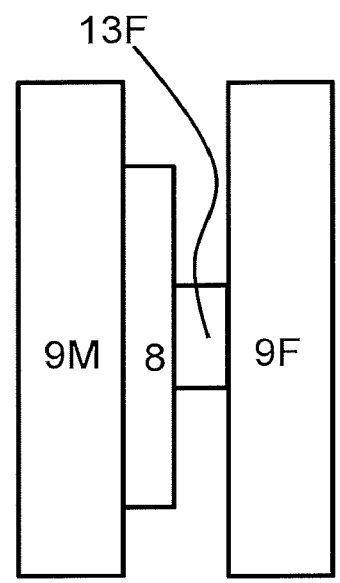
Fig. 20e  Fig. 20f

METHOD FOR MOULDING AN OPTICAL COMPONENT WITH THE COMPONENT BEING DIRECTLY COOLED BY A FLUID

The present invention relates to the field of methods and devices for installations for moulding optical components, notably optical components for vehicles, such as those used in motor vehicle lighting and/or signalling devices. More specifically, the present invention relates to a method for moulding an optical component which is a transparent element intended to cause light to converge or to diverge, such as an optical lens, or alternatively intended to propagate light by internal reflection, such as a light guide.

One tricky aspect of the production of these optical components is that of cooling the first layer injected, particularly when this is thick, whether this be the first and only layer or the first layer of a component formed by the successive overmoulding of several layers. The problem is that as the material cools, shrinkages of this material may occur at the surface. Now, in an optical component, certain surfaces are used to deflect rays in a determined direction. As a result, these shrinkages may cause the optical component not to deflect the rays of light in the desired way.

This can be particularly damaging in the case of a shaping optical component used in a vehicle lighting device, such as a headlamp or a tail light, particularly in the case of the shaping optics through which the light passes, such as lenses.

According to the application, a shaping optical component deflects rays of light emitted by the light source of the lighting device in such a way as to impart given photometric characteristics to the beam of the lighting device. The shaping optical component may be chosen from a reflector, a lens or a light guide, notably with a thick termination.

Shrinkages are even more damaging in the case of lenses and light guides. This is because their surfaces form dioptres through which the light passes in order to confer upon the rays the directions that make it possible to obtain given photometry.

Furthermore, the thicker the first layer and/or the greater the number of overmoulded layers, the more shrinkages will lead to significant impairment of the component.

Document WO2015017929 discloses a lens-moulding method in which a moulding step is used first of all in a cavity formed by the union of a first and of a second impression of a first and a second mould part respectively. Once the first layer has been moulded, the mould is opened, the second impression is removed, the moulded component remaining in the first impression. A cooling step is then performed, by closing a third impression onto the first impression so as to form a cavity housing the moulded component. The latter is in contact with the metal that forms the wall of the cavity, allowing heat energy to be removed. Two other cooling steps, changing one of the impressions that forms the cooling cavity, are then performed. Thereafter, two further moulding steps are performed in succession. In each of these steps, one of the impressions is removed, and the other kept with the component inside it.

Nevertheless, it is possible to improve upon this method in terms of its cooling.

The technical problem that the invention aims to overcome is therefore that of improving the cooling of optical components moulded during a moulding method.

To this end, one first subject of the invention is a method for moulding an optical component by means of a moulding device comprising a mould comprising:

two mould parts which close onto one another to close the mould and part from one another in order to open same,
at least one moulding station comprising a moulding cavity of which the walls are formed by a portion of each of the two mould parts,
at least one cooling station comprising a cooling space formed between a cooling portion of one of the mould parts and a cooling portion of the other of the mould parts, the said method comprising a first group of steps comprising:

a step of moulding a moulded component in the moulding cavity,
a transfer step, during which the moulded component is transferred from this moulding cavity into the cooling space, while keeping the moulded component facing at least one of the mould parts during this transfer step,
a cooling step, during which the moulded component is kept some distance away from the cooling portions, the cooling step comprising sending a cooling fluid between the moulded component and the cooling portions.

Thus, the cooling fluid allows better control over the cooling of the moulded component, by increasing the rate of cooling. Specifically, the material injected sets more quickly, and less shrinkage of the material is observed.

This fluid may be a gas, for example air, air being a simple and economical solution.

According to the invention, by placing the moulded component some distance away from the cooling portions, and therefore from the walls of these portions, and by injecting the cooling fluid between the moulded component and these cooling portions, air is therefore injected on both sides of the moulded component. This allows it to be cooled even more quickly.

These two sides of the moulded component are those which face the walls of the cooling portions, and therefore, in the case of one of them, face the sides of one of the mould parts and, in the case of the other, face the sides of the other of the mould parts. These sides will be more particularly suited to comprising a zone intended to receive rays of light in the end use for which the optical component is intended, for example deflecting rays of light to form a beam to illuminate the road, a signalling beam or a beam for illuminating the interior of a vehicle.

Furthermore, by remaining facing part of a mould during transfer, the component is not moved out of the moulding zone. This then saves time between the moulding step and the cooling step.

Like with any moulding, the moulding of the moulding step is performed with the mould closed and by injecting a material. This material may for example be a polycarbonate (PC) or polymethyl methacrylate (PMMA).

The method according to the invention may optionally exhibit one or more of the following features:

the mould comprises several moulding stations and several cooling stations, the method being implemented in such a way as to produce the optical component in several successive layers of one or more materials, each of the layers being obtained in a distinct moulding station, the first layer being formed by the first group of steps, one or more or even each of the additional layers each being obtained by a distinct additional group of steps comprising:
a transfer step, during which the moulded component is transferred from the cooling station in which it has been cooled into the moulding cavity of the next moulding station, while keeping the moulded component facing at least one of the mould parts during this transfer, a step of moulding the next layer onto the moulded component, a transfer step, during which the moulded component is transferred from the moulding station into the cooling space of the next cooling station, while keeping the moulded component facing at least one of the mould parts during this transfer, a cooling step, during which the moulded component is kept some distance from the cooling portions, the cooling step comprising sending a cooling fluid between the moulded component and the cooling portions;

and in this way the production of the optical component with precise surfaces is optimized, not only by producing the optical component in several layers but also by performing a cooling operation according to the invention also after certain of these layers, or even each of these layers, have been obtained;

the transfer step or steps are performed with the mould open and the cooling step or steps are performed with the mould closed, the moulded component being transferred from the moulding station into a cooling housing the walls of which are formed by the cooling portions and delimit the cooling space, the cooling fluid being sent into the cooling housing; by thus confining the optical component inside a housing, convective cooling by means of the cooling fluid is encouraged;

the stations are distributed about an axis of rotation, the steps of transferring from one station to a next station being performed by a rotational movement about this axis of rotation; this is an embodiment that allows rapid transfer from one station to another;

a first of the mould parts is a mould part that is fixed in terms of rotation and a second of the mould parts comprises a base which is fixed in terms of rotation and a rotary structure able to move away from the base, the portion or portions forming the moulding cavity or cavities and the cooling portion or portions borne by this second mould part being fixed on the base, the or each step of transferring from one given station to the next station comprising:

a sub-step of opening the mould, keeping the moulded component on the rotary structure, a sub-step of moving the rotary structure away from the support and from the moulding cavity portion or portions and from the cooling portions borne by this second mould part, a sub-step of rotating the rotary structure about the axis of rotation so that the moulded component comes between the moulding cavity portions or cooling portions of the next station;

that allows for simple movements by moving the moulded components and keeps the moulding cavity portions and cooling portions in place;

according to the above paragraph, the or each step of transferring from one given station to a next station further comprises, after the rotation sub-step:

a sub-step of bringing the rotation structure closer to the rotationally fixed support and to the moulding cavity portion or portions and cooling portion or portions borne by this second stage, so that the moulded component faces the corresponding moulding cavity portion or cooling portion, a sub-step of closing the mould;

the moulded component is thus kept more contained for performing the cooling;

the method comprises a step of removing the moulded component from the mould after the sole or final cooling step of the method has been performed, this removal being performed at a cooling station at which this sole or final cooling step has taken place;

the cycle of forming the moulded component is thus carried out completely in-mould;

the single or first layer of the moulded component is produced in such a way as to form the moulded component with an optical portion and at least one holding protuberance, notably not as thick as this optical portion, and:

the moulded component is held at some distance during the cooling step or steps by holding the or the at least one holding protuberance; and/or the holding of the moulded component during the transfer step or steps is performed by holding the or at least one holding protuberance;

the moulded component comprises holding protuberances distributed about the optical portion; this then enhances the holding; this optical portion may be a central portion of the moulded component;

the method comprises, after the removal step, a step of partially or totally parting off the holding protuberances;

the method comprises an action of cooling the zones of one or each mould part comprising the moulding cavity portions and/or the cooling portions using cooling-fluid secondary cooling ducts distinct from the cooling fluid primary cooling ducts used for sending the cooling fluid between the moulded component and the cooling portions; thus the moulding temperature is more easily controlled and/or the cooling of the moulded component is improved; the cooling fluid used in these secondary cooling ducts may notably be a liquid, notably water, or a gas, to improve the cooling of the zones in which the moulding cavities and the cooling spaces are formed;

the cooling fluid is injected into the cooling space, on each side of the moulded component, over the moulded component and in a direction corresponding to an optical axis of the moulded component; that allows the cooling fluid to be distributed more effectively over the entire surface of the optical component;

during implementation of the method according to the invention, each moulding cavity portion borne by one of the mould parts remains facing the same moulding cavity portion borne by the other of the mould parts and each cooling portion borne by one of the mould parts remains facing the same cooling cavity portion borne by one of the mould parts; the moulded component is thus moved more easily from one station to another.

Another subject of the invention is a mould for an optical component, notably a vehicle lighting device optical component. This mould comprises:

two mould parts which close onto one another to close the mould and part from one another in order to open same, at least one moulding station comprising a moulding cavity of which the walls are formed by a portion of each of the two mould parts, the moulding station comprising elements for injecting a material into the moulding cavity, at least one cooling station comprising a cooling space formed between a cooling portion of one of the mould parts and a cooling portion of the other of the mould parts, in this mould, the cooling station comprises holding elements allowing the moulded component to be held some distance from the cooling portions when the mould is closed, and comprises elements for injecting a cooling fluid into the cooling space.

Thus, this mould allows implementation of the method according to the invention. The transfer with mutual facing of one of the mould parts can be performed by a transfer means incorporated into the mould or separate from the mould.

The mould according to the invention may optionally exhibit one or more of the following features:

- the mould comprises several moulding stations; it is thus possible to produce a component by moulding successive layers; that makes it possible to produce thick components while at the same time optimizing the cooling time and improving the precision of the surfaces of the moulded component;
- a cooling station is arranged between each moulding station; that makes it possible to perform cooling before each overmoulding of a new layer;
- the mould comprises as many cooling stations as moulding stations; that makes it possible to carry out a cooling after each overmoulding of a new layer;
- the moulding stations are arranged in alternation with the cooling stations; it is easy to move on from one station to the other through a similar or identical movement; mass production is thus facilitated;
- the stations are distributed about an axis; that then makes it possible to transfer the moulded components from one station to the other through a rotational movement through a given angular sector; this axis may notably be an axis of rotation of one of the mould parts or of a sub-part of one of the mould parts;
- for each moulding cavity, the portion of at least one of the mould parts that form a part of the walls of this moulding cavity is formed by a main impression, the main impressions being increasingly deep from one moulding station to the other; that makes it possible to gradually increase the thickness of the moulded component;
- the mould comprises means of guiding the movements of the mould parts relative to one another in a translational direction in one sense of direction or the other, in order to open or close the mould; this is a simple and accurate way of opening or closing the mould;
- at the or each moulding station at least one of the mould parts comprises at least one lateral hollow portion extending from the moulding cavity and communicating therewith, so as to allow the first moulding station to mould a moulded component with a main portion and at least one lateral protuberance which are respectively formed in the moulding cavity and in the lateral hollow portion or portions, and so as to allow this or these protuberances to be housed in the lateral hollow portion or portions of the other station or stations; these protuberances may form the holding protuberances referred to hereinabove;
- the elements for injecting a material comprise a duct for injecting a material into the moulding cavity, comprising the hollow portion or portions and at least one injection duct opening on one side into the hollow portion or portions and on the other side being able to be connected to a moulding press that injects a material, notably a polymer material; that allows the material to be injected into the cavity via the lateral hollow portions, and allows moulding to be simplified;
- at the or at least at one of the cooling stations, each mould part comprises a primary cooling duct opening into the cooling space via a cooling orifice formed in the corresponding cooling portion, each primary cooling duct being connected to a connector able to be connected to a device for dispatching a cooling fluid, for example a compressor when this cooling fluid is a gas; that allows the cooling fluid to be sent directly onto the moulded component;
- in this mould:
  - a first of the mould parts is a mould part that is fixed in terms of rotation and a second of the mould parts comprises a base and a rotary structure,
  - the moulding cavity portion or portions and the cooling portion or portions borne by this second mould part are fixed to the base,
  - the rotary structure is able to move away from the base and from the moulding cavity portion or portions and from the cooling portion or portions fixed to this base by moving from a retracted position towards a deployed position, in which the rotary structure is able to rotate with respect to the base, and
  - the rotary structure comprises means for holding the moulded component on this rotary structure as the latter moves away from or turns with respect to the base;

that allows simple movements by moving the moulded component or components and keeping the moulding cavity portion or portions and the cooling portions in place;

- the or each step of transferring from one given station to a next station further comprises, after the rotation sub-step:
  - a sub-step of bringing the rotary structure closer to said support and to the moulding cavity portion or portions and to the cooling portion or portions borne by the second stage, so that the moulded component faces the corresponding cavity portion or cooling portion,
  - a sub-step of closing the mould;
- the rotary structure is a rotary stage comprising insertion housings passing through the thickness of the rotary stage, these insertion housings being arranged in such a way as to surround the moulding cavity portion or portions and the cooling portion or portions borne by this second stage in said retracted position and so as to be parted therefrom in the deployed position;

that allows the moulded components to be driven in a simple way with the rotary structure and then repositioned at the next station;

- according to the above paragraph, the moulding cavity portion or portions and the cooling portion or portions are formed in a block, notably a removable insert of the second mould part, this or these blocks having dimensions that allow them to be fitted into the insertion housings, in the retracted position;
- the blocks of the cooling stations comprise at least one portion of the primary cooling duct;
- the blocks of the cooling stations comprise canals for the passage of a cooling fluid distinct from the primary cooling duct and extending between an inlet and an outlet, each opening to outside of the cooling space;

the direct cooling of the insert and that of the moulded component are thus separated;

one of the cooling housings, referred to as the final housing, has an extraction opening on the side of the mould when this mould is closed, the depth of the cooling space and the width of the extraction opening being designed in such a way as to allow the moulded component to be extracted without opening the mould.

The method and the mould according to the invention are particularly well suited to the creation of a shaping optical component, for example a lens, able to be installed inside a motor vehicle headlamp in order to divert rays of light, the optical component being transparent, and notably a component comprising a central layer and one or more further overmoulded layers.

Further features and advantages of the invention will become apparent from reading the detailed description of nonlimiting examples which follow, for an understanding of which reference will be made to the attached drawings, among which:

Figure 2:
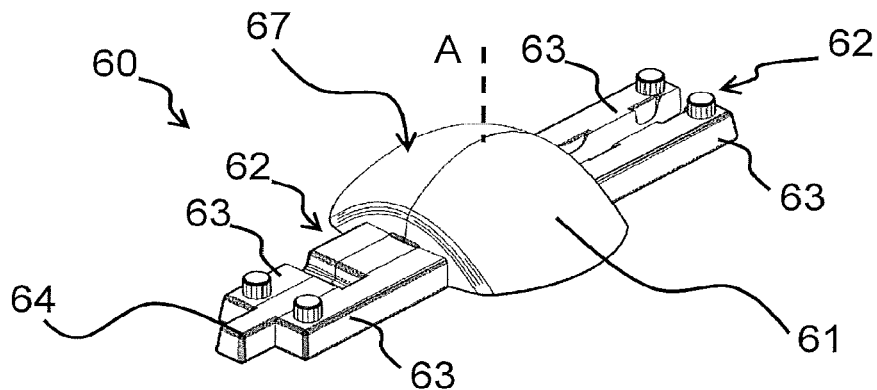
Figure 4:
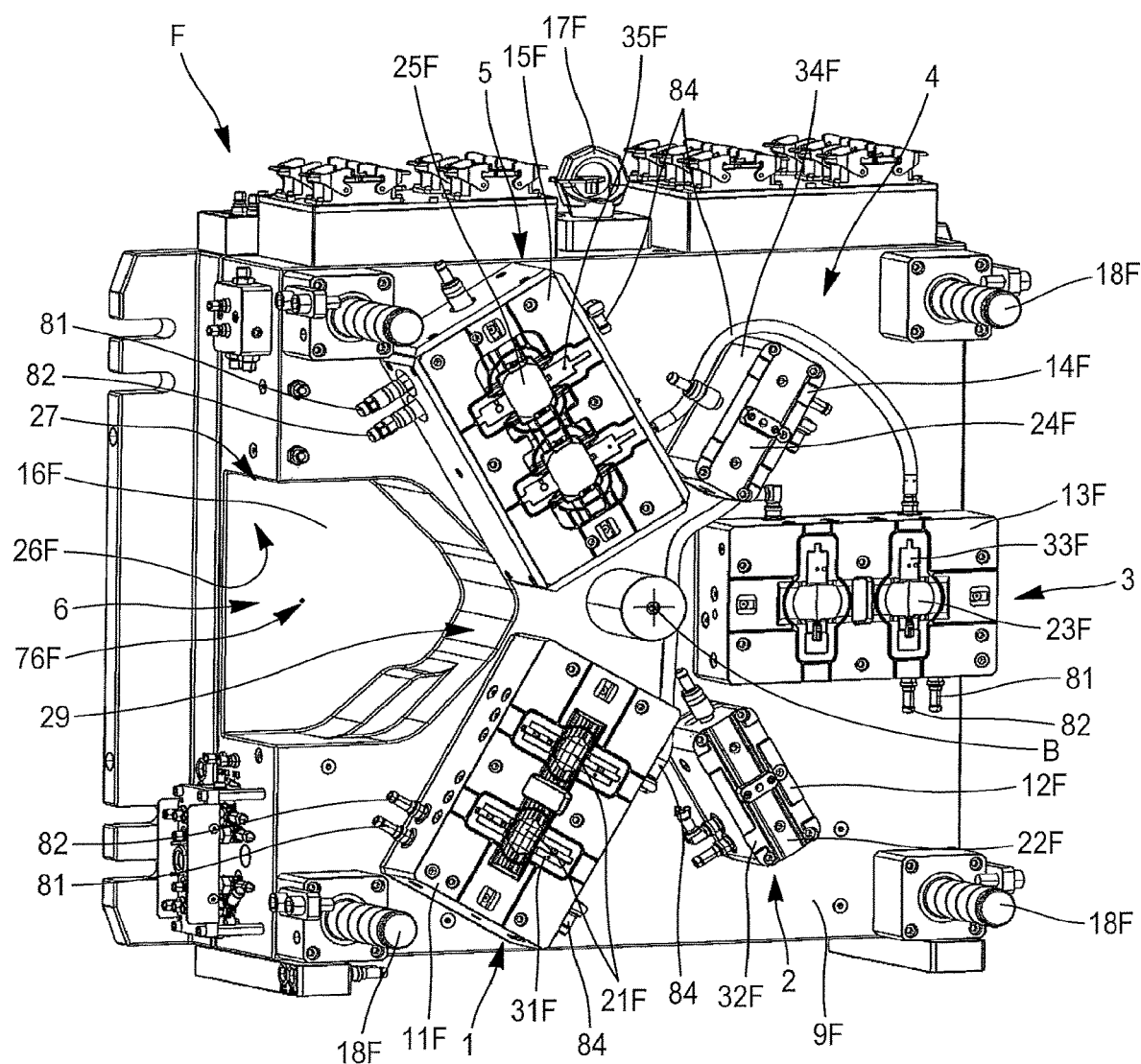
FIG. 4 illustrates a first mould part of one example of a mould according to the invention.
Figure 5:
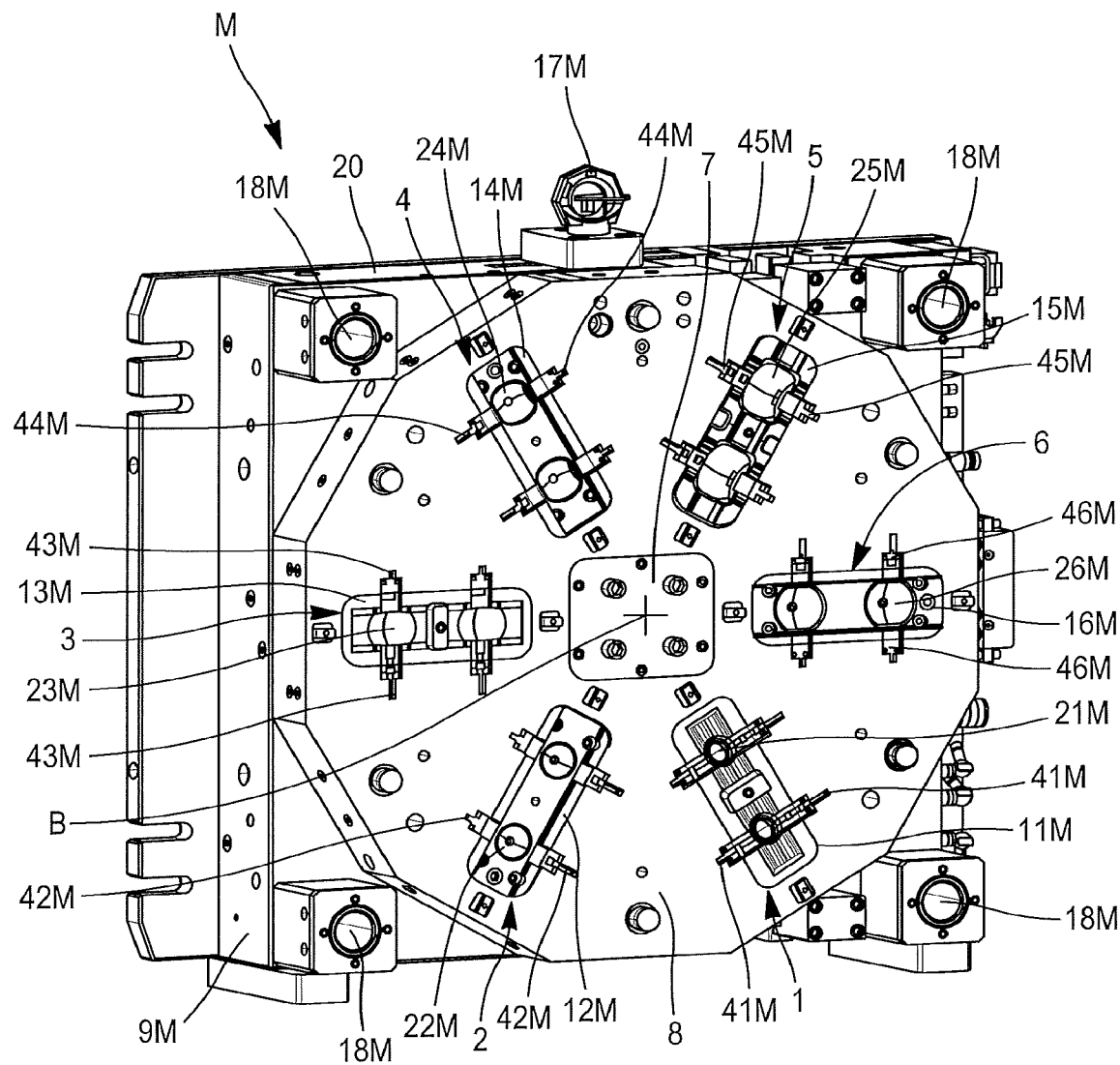
FIG. 5 illustrates a second mould part which closes onto the first mould part of FIG. 4 to close the mould according to the invention.
Figure 7:
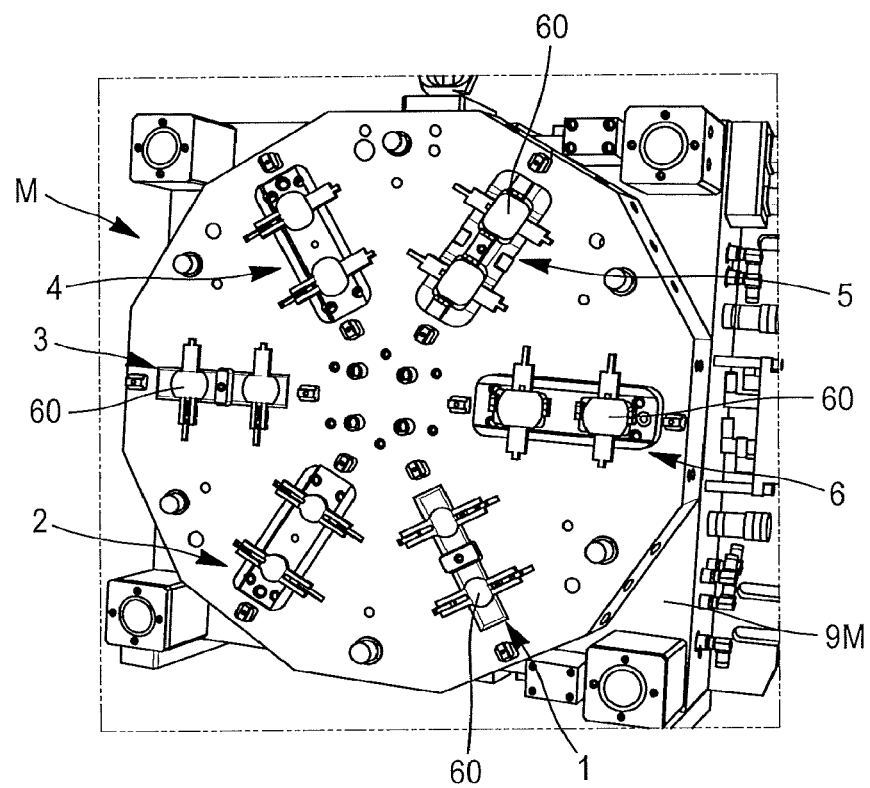
FIG. 7 depicts the mould part of FIG. 5 when the mould is open during the course of the production of moulded components using moulded components of FIGS. 1 to 3.
Figure 8:
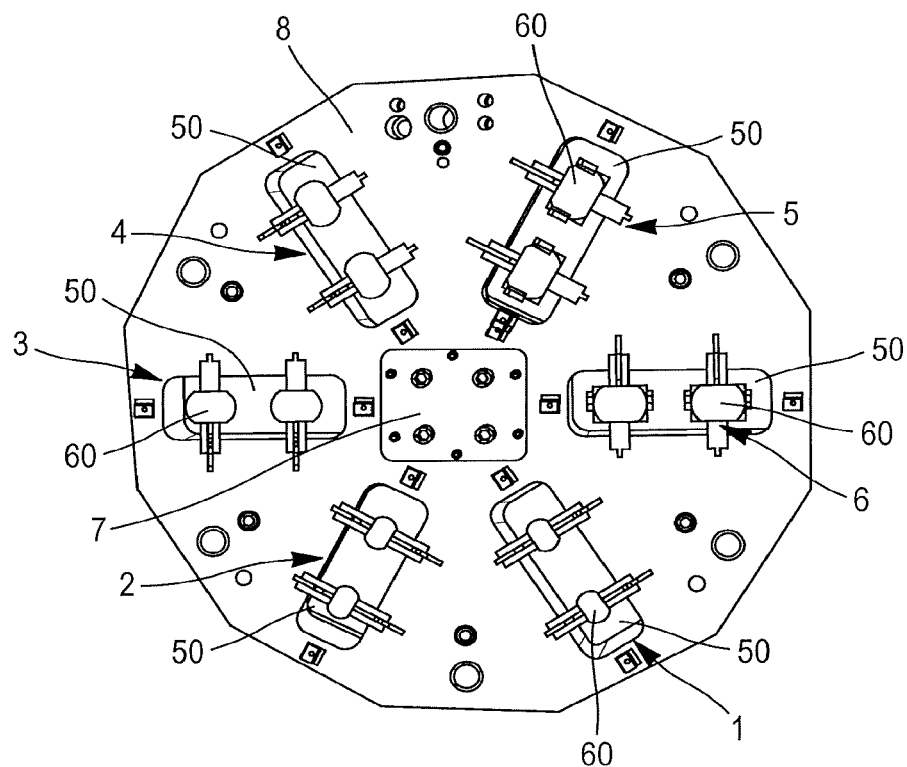
FIG. 8 illustrates a rotary stage of the mould part of FIG. 7, bearing the moulded components.
Figure 9:
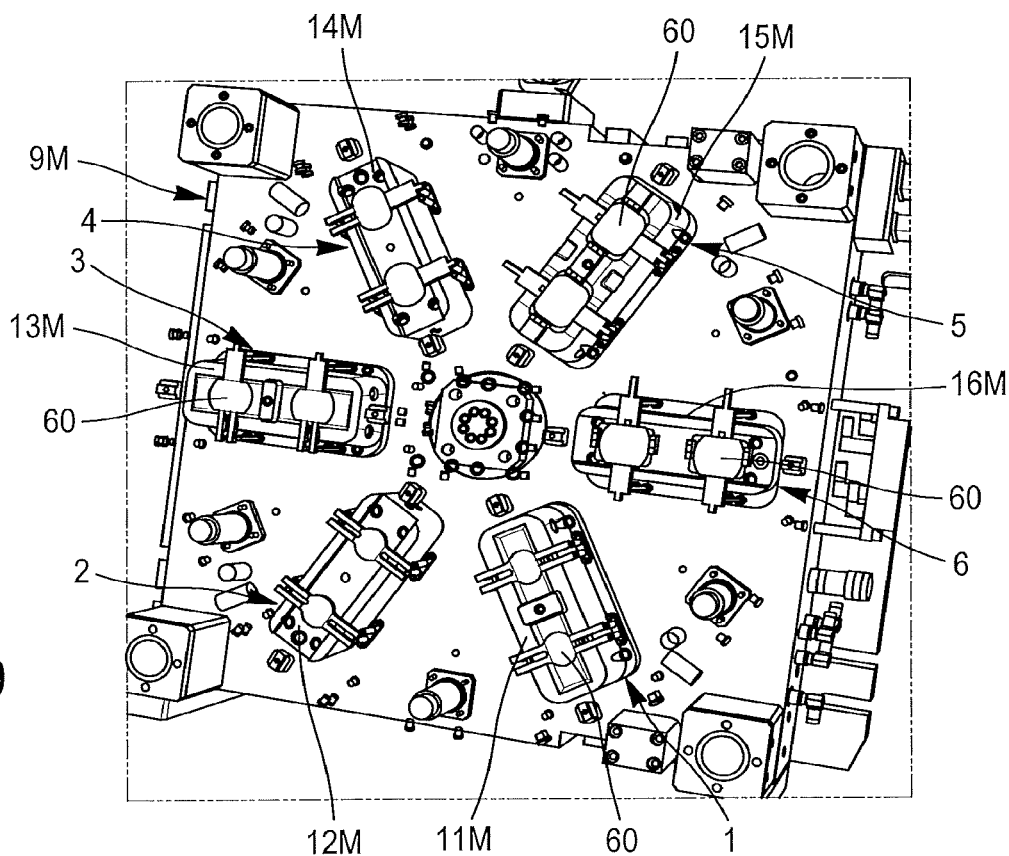
Figure 10:
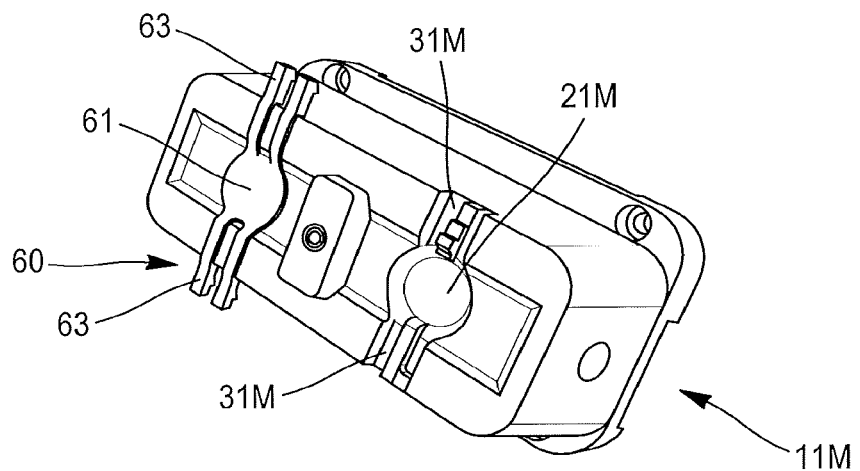
Figure 11:
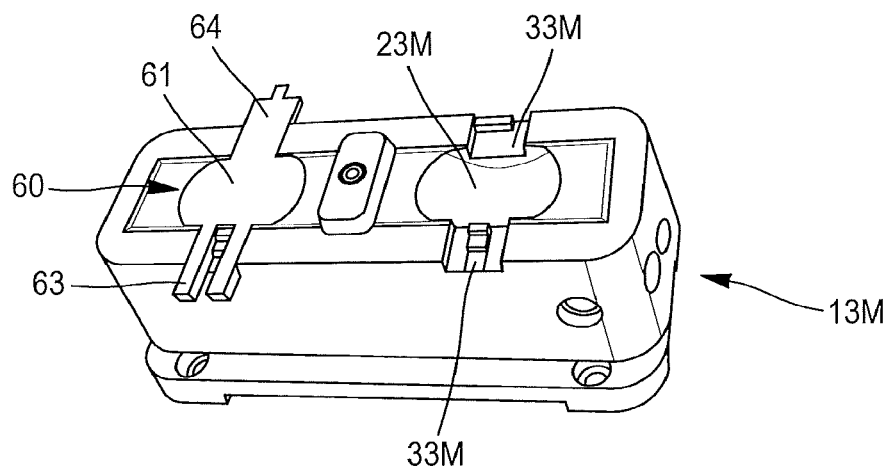
Figure 12:
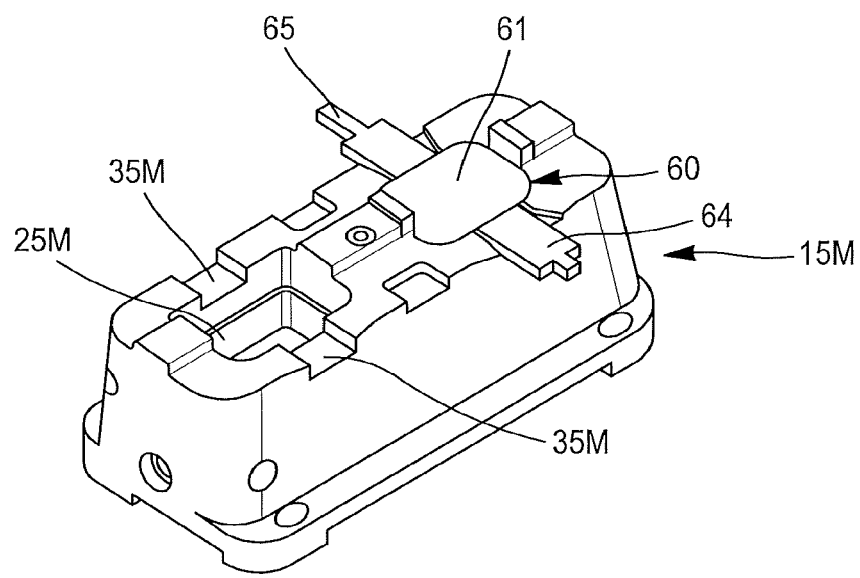
Figure 13:
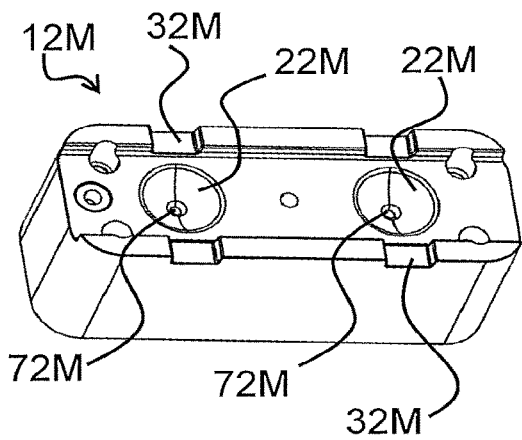
Figure 14:
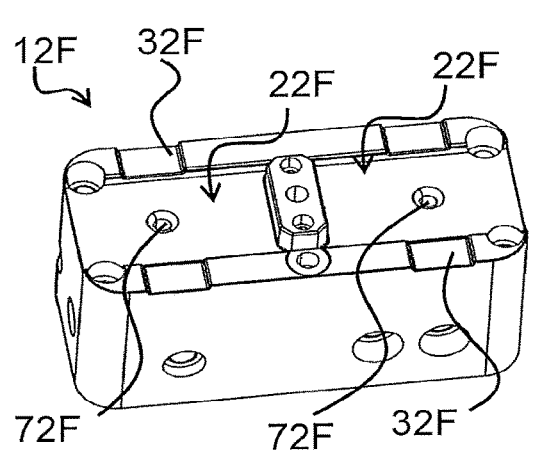
Figure 15:
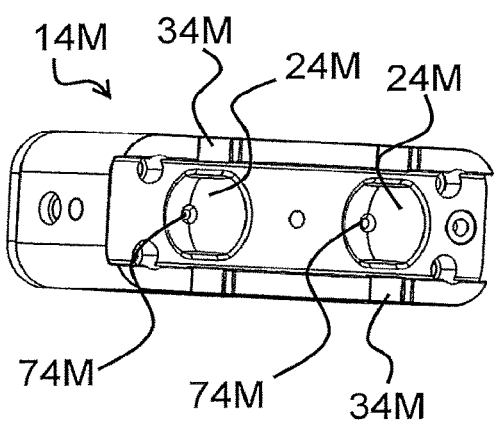
Figure 16:
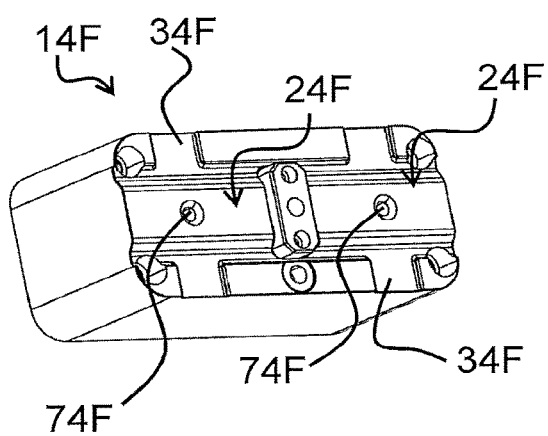
Figure 17:
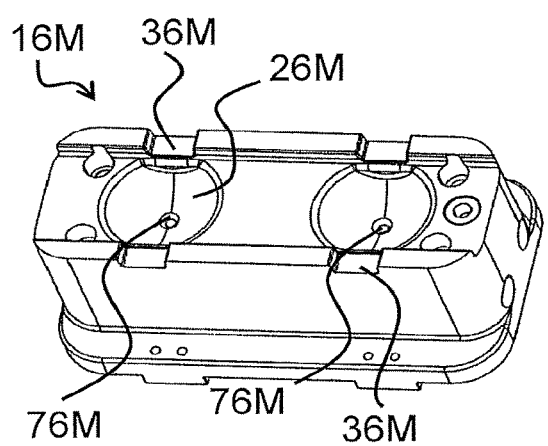
Figure 18:
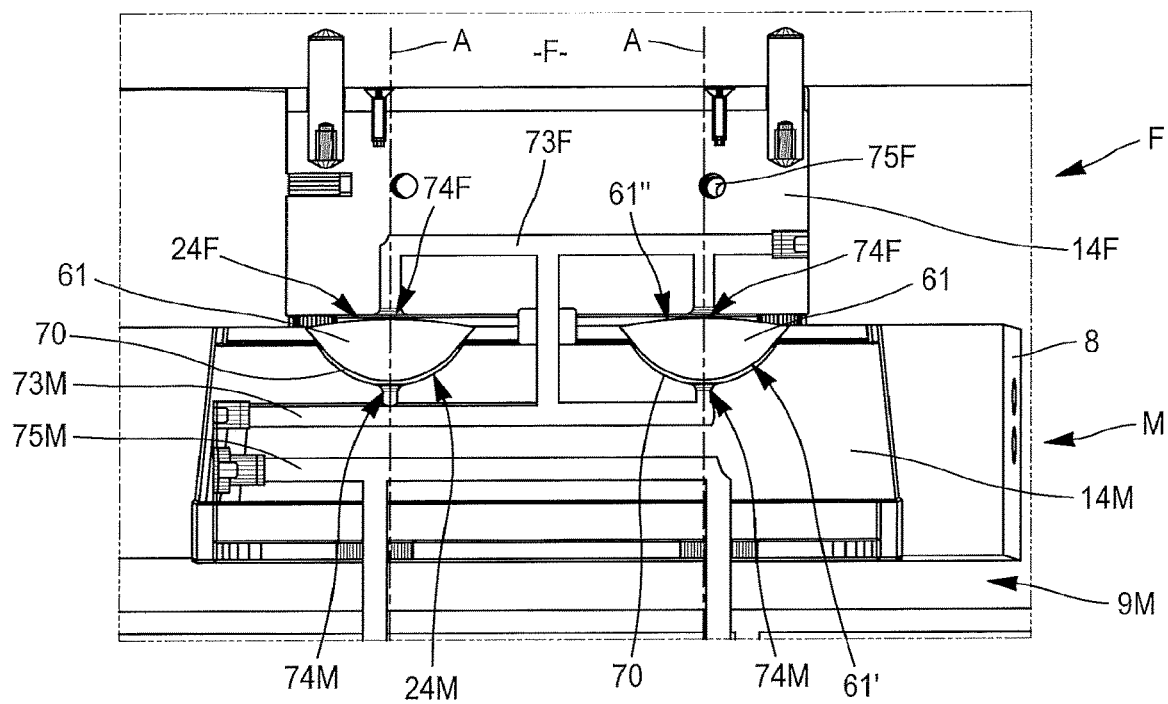
Figure 19:
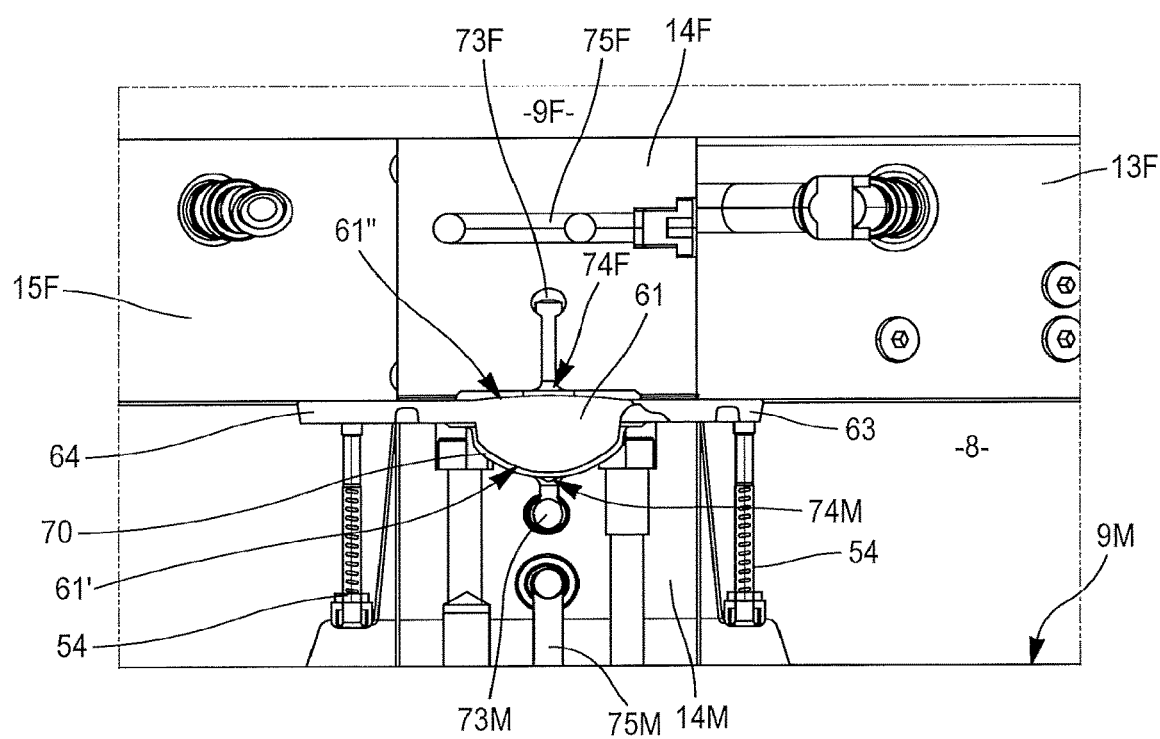

FIG. 9 differs from FIG. 7 in that the rotary stage of FIG. 8 is not depicted;

FIGS. 10, 11 and 12 illustrate blocks of the various moulding stations depicted in FIG. 9;

FIGS. 13 and 14 illustrate the blocks of a first cooling station which are mounted respectively on the mould part illustrated in FIG. 5 and on the mould part illustrated in FIG. 4;

FIGS. 15 and 16 illustrate the blocks of a second cooling station which are mounted respectively on the mould part illustrated in FIG. 5 and on the mould part illustrated in FIG. 4;

FIG. 17 illustrates the block of a third cooling station mounted on the mould part illustrated in FIG. 5;

FIG. 18 is a schematic cross section through the mould parts of FIGS. 4 and 5 closed onto one another, the section being taken in the region of the second cooling station along a plane passing through the optical axis of the moulded components, such as that of FIG. 2 and cooled in this cooling station;

FIG. 19 is a schematic cross section at the same point as the cross section of FIG. 18, but on a plane passing through the optical axis of just one of the moulded components cooled in this station, this plane extending along the holding protrusions of this moulded component;

FIGS. 20a to 20f illustrate a transfer step for one exemplary embodiment of a method according to the invention.

Figure 1:
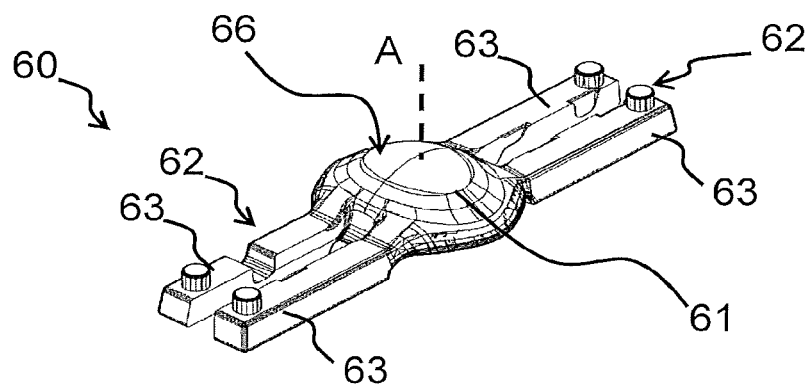
FIGS. 1 to 3 illustrate a front perspective view of a moulded component according to one example of a method according to the invention, after successive moulding of a first, a second and a third layer, respectively.
Figure 3:
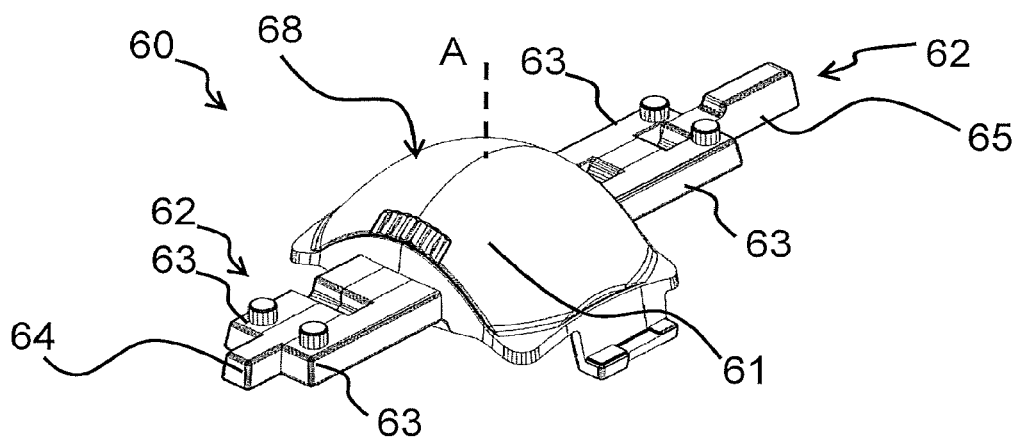

FIGS. 1 to 3 illustrate a moulded component produced according to one exemplary embodiment of a moulding method according to the invention. The moulded component 60 is illustrated in FIGS. 1 to 3 after each of the moulding steps of this method.

FIG. 3 shows the moulded component 60 after the last moulding step and which, in this example, exhibits an optical portion 61 intended to form a definitive optical component, in this instance of a vehicle lighting device. This optical portion 61 is intended to have the rays of light passing through it when the optical component is in use, in this instance in a vehicle lighting device.

In this example, this portion and this optical component are a lens 61.

This lens 61 exhibits a front surface visible in FIG. 3 and, opposite that, a rear face which is not visible in this FIG. 3.

These front and rear surfaces are in this instance convex and each have a vertex through which an optical axis A passes.

FIG. 1 illustrates the moulded component 60 after the moulding of a first layer of a material 66. This moulded component comprises the optical portion 61 and, on each side of this optical portion 61, two holding protuberances 62.

The optical axis A of the lens, formed in FIG. 3, here also corresponds to the optical axis of the optical portion 61 in FIG. 1 and that of the optical portion 61 of FIG. 2.

Holding protuberances 62 are arranged on the sides of this optical portion 61, namely on each side of the front and rear surfaces, approximately transversely with respect to the optical axis A.

After the first layer 66 has been moulded, these holding protuberances 62 are formed by two transverse bars 63, notably parallel, between which a filling space is left.

FIG. 2 illustrates the moulded component 60 after overmoulding of a second layer 67 onto the first layer 66. Once again there is the optical portion 61 and the holding protuberances 62. The second layer 67 therefore covers the optical portion 61 formed by the first layer 66, in front of and to the rear thereof.

This second layer 67 here also extends into the filling space of one of the holding protuberances 62, thus forming a first filling portion 64.

FIG. 3 illustrates the moulded component 60 after the overmoulding of a third layer 68 on the second layer 67. Once again there are the optical portion 61 and the holding protuberances 62. The third layer 68 therefore covers the optical portion 61 formed by the second layer 67, in front of and to the rear thereof, thus forming the lens.

This third layer 68 once again extends into the filling space of the other of the holding protuberances 62, forming a second filling portion 65.

According to the invention, the optical axis A of the optical portion 61 may be the axis with respect to which the shapes of its dioptres are calculated, in this example the front and rear surfaces of the optical portion 61 after each moulding of a layer of the corresponding moulded component 60.

The optical axis A may, as it is here, be the axis along which any ray of light arriving along this optical axis A at the optical portion 61 passes through this optical portion from its rear face to its front face without being deflected.

The mould that allows the various moulded components 60 like the one illustrated in FIGS. 1 to 3 to be moulded comprises two mould parts, which close one onto the other to close the mould, and can be parted from one another in order to open same.

FIG. 4 illustrates a first mould part F which, in this example, is fixed and will therefore be referred to hereinafter as the fixed mould part F. This part notably comprises, on what is referred to as its internal face, four guide shafts 18F distributed one in each of its corners.

In this instance, the internal face of the fixed mould part F is square. This form of embodiment is nonlimiting.

The second mould part, illustrated in FIG. 5, is a part able to move translationally with respect to the fixed mould part F, notably as can be seen in FIG. 5 along an axis B passing through the centre of the internal face of the mobile mould part M and through the centre of the internal face of the fixed mould part F. This second part will be referred to hereinafter as the mobile mould part M.

Each of these mould parts F, M comprises a lifting eye 17F, 17M allowing them to be moved and mounted in a moulding installation, in such a way that the internal faces of each of these mould parts F, M are arranged facing each other. In other words, the faces visible in FIGS. 4 and 5 are mounted so that they face one another.

In this example, the mobile mould part M comprises guide barrels 18M, in which the guide shafts 18F become lodged in order to guide the two mould parts M, F in translational movement relative to one another.

According to one embodiment of the invention, as in this example, the mould comprises three moulding stations 1, 3, 5 and three cooling stations 2, 4, 6.

In this instance, the three cooling stations 2, 4, 6 are arranged in alternation with the three moulding stations 1, 3, 5.

In this example, each station is designed to carry out a step of moulding or cooling two moulded components simultaneously.

According to the invention, as in this example, the moulding stations 1, 3, 5 may each comprise two moulding blocks: a moulding block 11F, 13F, 15F fixed on the fixed mould part F and a moulding block 11M, 13M, 15M fixed on the mobile mould part M.

As illustrated, each of these moulding blocks may comprise two moulding impressions. The two moulding impressions 21F, 23F, 25F of the moulding blocks 11F, 13F, 15F of the fixed mould part F join up with the moulding impressions 21M, 23M, 25M of the moulding blocks 11M, 13M, 15M of the mobile mould part M to form the two corresponding moulding cavities of each of the moulding stations 1, 3, 5. The moulding impressions form the walls of the moulding cavities.

Once the mould is closed, it is possible to inject a material into each of the moulding cavities until these are completely full and to form the corresponding moulded component 60.

Here, on each mould part F, M, the impressions are increasingly deep from the moulding station used to mould the first layer to that used for the third layer.

At the same time, the cooling stations may each comprise two cooling blocks, as is the case with the first and second cooling stations 2 and 4:
 a cooling block 12F, 14F fixed on the fixed mould part F, notably on a fixed base 9F of the fixed mould part F, and
 a cooling block 12M, 14M fixed on the mobile mould part M, notably on a mobile base 9M of the mobile mould part M.

Note that in this example, at the third cooling station 6, the fixed mould part F has no cooling block. Instead, the fixed base 9M comprises an ejection cavity 16F, visible in FIG. 4, of a size greater than that of the cooling block 16M borne by the mobile mould part M of this third cooling station 6.

When the cooling blocks 12F and 12M, 14F and 14M of the first and second cooling stations are facing one another, a cooling space 70 is formed between them (these cooling spaces 70 are referenced in FIGS. 18 and 19). Likewise, when the cooling block 16M of the third cooling station and the ejection cavity 16F are facing one another, a cooling space is formed between them. The corresponding lens 61 can be positioned in these positioning spaces 70 so that a cooling fluid, such as a gas, can be dispatched thereinto.

According to the invention, as in this example, the cooling of the moulded component in the cooling spaces 70 may be performed with the mould closed. The cooling space 70 is thus smaller, improving the concentration of cooling fluid against and around the corresponding optical portion 61.

According to the invention, as in this example, in order to further confine the moulded component 60 inside the cooling space 70, the cooling stations 2, 4, 6 comprise recesses in which the moulded components 60 are housed in order to cool them. These recesses may be concave recesses and/or recesses formed by a groove.

In the example illustrated, the recesses in the mobile mould part M are borne by the cooling blocks 12M, 14M, 16M of the corresponding cooling stations 2, 4, 6. These recesses in this instance are concave recesses 22M, 24M, 26M referred to as such hereinafter.

According to the invention, as in this example, the concave recesses 22M, 24M, 26M may have a depth and a width that are greater than those of the moulding impression of the previous moulding station 1, 3, 5 so that the moulded component 60 or a portion thereof, in this instance the front face of the optical portion 61, becomes lodged in the corresponding concave recess some distance away from the wall of the concave recess. This makes it easier to guide air around one side of the moulded component 60. In this example, it is even more advantageous since the front face of the optical portion 61 is highly convex.

This distance between the walls of the concave recesses and the optical portion 61 can be minimized in order to improve the confinement, while at the same time allowing the cooling fluid to pass.

In the example illustrated, the recesses in the fixed mould part F are borne by the cooling blocks 12F, 14F of the corresponding cooling stations 2, 4. These recesses in this instance are grooves 22F, 24F and are referred to as such hereinafter.

According to the invention, as in this example, the moulding blocks 11F, 13F, 15F borne by the fixed mould part F comprise inlets for the injection of a material and an injection outlet for material (these are not visible in the figures) so as to convey the molten material into the corresponding moulding cavities. The injection inlets and the injection outlets are connected to injection pipes, not depicted, connected to an injection moulding press, not depicted, of the moulding installation.

These moulding blocks 11F, 13F, 15F may also comprise vents for discharging the gas compressed by the injection material.

A secondary cooling circuit is provided for supplying these moulding blocks 11F, 13F, 15F with a cooling fluid, in this instance water, circulating inside these blocks in order to control the wall temperature of the moulding cavities. In the example illustrated in FIG. 4, it may be seen that there are water inlets 81 and water outlets 82 for conveying water into the corresponding moulding block 11F, 13F, 15F and removing it therefrom. In FIG. 4, it may also be seen that there are regulation bridges 84 formed by ducts connecting the moulding blocks 11F, 13F, 15F to one another and allowing the circulation of the cooling fluid between these moulding blocks to be regulated.

As can be seen in FIG. 5, the mobile base 9M is, in this instance, however mobile only in terms of translation. The mobile mould part M also comprises a rotary structure, in this instance a rotary stage 8, capable of rotational movement with respect to the mobile base 9M.

Figure 6:
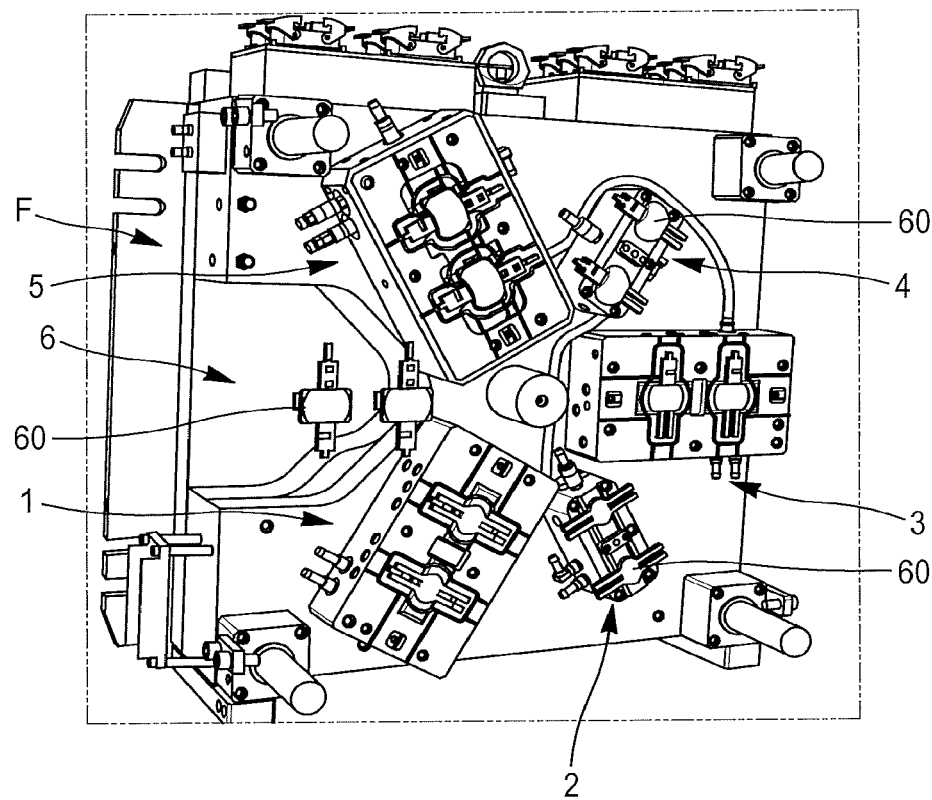
FIG. 6 depicts the mould part of FIG. 4 but with moulded components of FIGS. 1 to 3, depicted as they are when the mould is closed.

FIG. 6 and FIG. 7 each depict one of the mould parts F, M with the moulded components 60 in position in each of the stations 1 to 6, as the mould is being closed, but with the other mould part M, F not having been depicted, so as to be able to see these moulded components 60.

FIG. 8 shows the rotary stage 8 borne by an indexing stage 7. A transfer shaft 10, depicted in FIG. 9, drives the indexing stage 7, and therefore the rotary structure 8, in a translational and rotational movement along/about the axis of rotation B.

The rotary stage 8 comprises insertion openings 50, extending radially about the axis of rotation B of the indexing stage 7.

FIG. 9 depicts FIG. 7 but without the rotary stage 8, in order to provide a better view of the blocks 11M to 16M fixed on the mobile base 9M.

FIG. 7 shows the blocks 11M to 16M inserted and fitted in these insertion openings 50 so as to be able to slide inside these insertion openings 50.

Thus, the rotary stage 8 may be turned in front of the mobile base 9M by the transfer shaft 10 until it disengages from the blocks 11M to 16M. Next, the transfer shaft drives the rotary stage 8 in rotation so that the insertion housings 50 are offset by one angular sector, in this instance by 60°, in the clockwise direction of FIG. 7, bringing them to the next station.

When the transfer has been completed, the transfer shaft 10 returns the rotary stage 8 toward the mobile base 9M, the blocks 11M to 16M become inserted in one of the insertion housings 50.

As can be seen from these FIGS. 7 to 9, the holding protuberances 62 of the moulded components 60 extend beyond the sides of the various blocks 11M to 16M. These holding protuberances 62 are forward of the rotary stage 8 in FIGS. 7 and 8, thus making them easier to drive as one with this rotary stage. Because the moulded components 60 are thus held on the rotary structure 8, that allows them to move on from one station to the next.

Thus, rotating the rotary structure by a given angular sector, here of 60°, allows each moulded component to be passed on from one station 1, 2, 3, 4, 5 to a following station 2, 3, 4, 5, 6, except for the components that are already present in the last station, in this instance the third cooling station 6, which are themselves ejected before this rotary stage 8 turns.

FIGS. 6 to 9 show the moulded components 60 in the various workstations at a moment in the manufacturing process that will be described further on:
- at the first station 1, namely at the first moulding station, there may be seen two moulded components 60 corresponding to the first layer which have just been moulded,
- at the second station 2, namely at the first cooling station, it is possible to see two moulded components 60 obtained beforehand in the first station 1 and which are in the process of cooling,
- at the third station 3, namely at the second moulding station, there may be seen two moulded components 60 cooled beforehand in the second station 2 and the second layer of which has just been injected,
- at the fourth station 4, namely at the second cooling station, there may be seen two moulded components 60 obtained beforehand in the third station 3 and which are in the process of cooling,
- at the fifth station 5, namely at the third moulding station, there may be seen two moulded components 60 cooled beforehand in the fourth station 4 and the third layer of which has just been injected,
- at the sixth station 6, namely at the third cooling station, there may be seen two moulded components 60 obtained beforehand in the fifth station 5 and which are in the process of cooling, before being removed from the mould.

Thus, in this mould, twelve moulded components 60 are in the process of being produced after each closing of the mould, at different stages in their manufacture.

FIGS. 10 to 12 illustrate in detail the moulding blocks 11M, 13M, 15M of the mobile mould part M, these blocks respectively being those of the first moulding station 1, of the second moulding station 3 and of the third moulding station 5.

In these FIGS. 10 to 12 in order to facilitate comparison, one of the impressions 21M, 23M, 25M of these moulding blocks has been illustrated empty, and the other of these impressions filled with the corresponding layer.

Each of these moulding blocks 11M, 13M, 15M comprises lateral runners 31M, 33M, 35M which open into the corresponding moulding impressions 21M, 23M, 25M.

On the other side, these lateral runners 31M, 33M, 35M open onto the side of the corresponding moulding block 11M, 13M, 15M and are arranged in such a way as to communicate with complementary runners 41M, 43M, 45M formed on the contact surface of the rotary stage 8, namely the surface visible in FIG. 7 and facing the fixed mould part F.

When the mould is closed, these lateral runners 31M, 33M, 35M and these complementary runners 41M, 43M, 45M are arranged facing lateral runners, referred to as fixed runners 31F, 33F, 35F opening into the moulding impressions 21F, 23F, 25F of the corresponding moulding blocks 11F, 13F, 15F of the fixed mould part F. These runners thus form lateral hollow portions which here, together, form lateral ducts opening into the moulding cavities and which, once filled, allow the moulding of the holding protuberances 62 of the corresponding moulded component 60.

As a result, as can be seen in FIGS. 10 to 12, once moulded, the holding protuberances 62 extend beyond the corresponding moulding block 11M, 13M, 15M and become lodged in the complementary runners 41M, 43M, 45M. Thus, when the rotary structure 8 moves away from the mobile base 9M, it carries the moulded component 60 with it and removes it from the corresponding moulding block 11M, 13M, 15M.

According to the invention, as here, the injection inlets and injection outlets can be connected respectively to injection orifices and discharge orifices opening into said lateral ducts. The latter therefore channel the material as far as the corresponding moulding cavity.

Here, in the case of the second moulding station 3, the various runners 33M, 43M, 33F are able to accommodate the holding protuberances 62, and are arranged in such a way as to hold the optical portion 61 some distance away from the walls of the moulding cavity 23F/23M of this second moulding station 3. Thus, when the material is injected, the second layer 67 covers the front face and the rear face of the optical portion 61 housed in the corresponding moulding cavity.

Moreover, on one of the sides of the moulding cavity 23F/23M, the runners form two parallel lateral ducts in which to accommodate, as a close fit, the transverse bars 63 of the moulded component 60 with its first layer.

By contrast, on the other side of this moulding cavity 23F/23M, there is just one lateral duct present. This lateral duct is designed to hold the transverse bars 63, but leaving the filling space between the transverse bars 63 to open into the moulding cavity. Thus, upon injection of the second layer 67, the material fills this filling space and forms the first filling portion 64, giving the holding protuberance 62 situated on that side the form of a solid bar.

As in this example, in the case of the third moulding station 5, there is just one lateral duct arranged on each side of the moulding cavity, in order to accommodate, on one side, the holding protuberance in the form of a solid bar and, on the other, the two transverse bars 63. In the same way as at the second moulding station 3, the lateral duct accommodating the two transverse bars 63 is arranged in such a way that the material fills the filling space and forms the second filling portion 65, giving the holding protuberance 62 situated on that side the form of a solid bar also.

FIGS. 13 to 17 illustrate the cooling blocks of the mould.

FIGS. 13, 15 and 17 respectively illustrate the cooling blocks 12M, 14M, 16M of the first, second and third cooling stations and which are fixed against the mobile base 9M visible in FIG. 9.

FIGS. 14 and 15 illustrate the cooling blocks 12F, 14F of the first and second cooling stations 2, 4, which are fixed against the fixed base 9F and which, when the mould is closed, are arranged facing the corresponding cooling blocks 12M, 14M, of the mobile mould part M, as illustrated in FIGS. 13 and 15.

Each of the cooling blocks 12F, 12M, 14F, 14M of the first two cooling stations 2, 4, comprises lateral housings 32F, 32M, 34F, 34M to house the holding protuberances 62, in this case as a close fit. These lateral housings 32F, 32M, 34F, 34M are designed in such a way that once the mould is closed, the moulded components 60 are held by the holding protuberances 62, with the front surface and the rear surface of the optical portion 61 some distance away from the walls of the concave recesses 22M, 24M and from the walls of the corresponding grooves 22F, 24F. These walls are referred to as cooling walls. In other words, once the mould is closed again, the cooling blocks 12F, 12M, 14F, 14M form a cooling space 70 delimited by these cooling walls, which form the cooling portions of the first and second cooling stations 2, 4.

As can be seen in FIG. 4, the ejection cavity has an end wall formed by a vertical end wall 26F, extending in a plane perpendicular to the axis of rotation B, and facing the concave recesses 26M of the cooling block 16M borne by the mobile mould part M at this third cooling station 6 and illustrated in FIG. 17.

Here, the ejection cavity 16F is delimited along the sides, at the top, at the bottom and on the right in FIG. 4, by a lateral wall 29. This ejection cavity 16F is open at the level of the edge of the mobile base 9M via an ejection opening 27.

Thus, when the mould is closed, the moulded components 60 can be cooled in the cooling space formed between the vertical end wall 26F, the lateral walls 29 and the cooling block 16M situated facing this end wall.

The cooling block 16M of the mobile mould part M of this third cooling station 6 also comprises lateral housings to house the holding protuberances 62, in this instance as a close fit. These lateral housings are arranged in such a way that once the mould is closed again, the moulded components are held by the holding protuberances 62, with the front surface and the rear surface of the optical portion 61 some distance away from the walls of the concave recesses 26M of this cooling block 16M and of the vertical end wall 26F. These walls and this end wall 26F therefore form cooling walls and therefore the cooling portions of the third cooling station 6.

Each concave recess 22M, 24M, 26M here comprises in its end wall an air inlet orifice 72M, 74M, 76M respectively, here arranged in its end wall and connected to a primary cooling duct carrying the air. Each of these orifices 72M, 74M, 76M may, like here, be arranged in such a way as to send air onto the centre of the front surface 61' of the optical portion 61, as can be seen in FIGS. 18 and 19.

Similarly, each groove 22F, 24F comprises, in its end wall, two air inlet orifices 72F, 74F respectively. Each orifice is connected to a primary cooling duct conveying air. Each of these orifices 72F, 74F can be arranged in such a way as to send air to the centre of the rear surface 61" of the optical portion 61.

Likewise, in this example, an orifice 76F is formed in the vertical end wall 26F and connected to a primary cooling duct to send air to the side of the rear surfaces 61" of the optical portions 61 which are situated in the sixth station 6.

The primary cooling ducts are, for example, supplied with air by a compressor.

It is thus possible to send air over each side of the moulded components 60, more specifically the optical portion 61 thereof.

FIGS. 18 and 19 illustrate cross sections of the second cooling station 4 when the mould is closed.

In FIG. 18, the cross section is taken along a plane along the length of a cooling block 14M, namely at right angles to the surfaces of the two, fixed F and mobile M parts. In addition, this plane of section passes through the optical axes A of each of the moulded components 60 cooled at this station 4.

FIG. 19 depicts the same cooling station 4 but on a different plane of section passing through the optical axis A of one of the moulded components 60 and parallel to the holding protuberances 62. Therefore only one of the moulded components 60 cooled at this station 4 is visible.

The cooling block 14F mounted on the fixed base 9F is positioned against and facing the cooling block 14M borne by the mobile base 9M and housed in the rotary stage 8. These blocks 14F/14M between them define two cooling spaces 70 inside which the optical portions 61 of two moulded components 60 are housed.

The rear surface 61" and the front surface 61' of each of the optical portions 61 are positioned some distance away from the cooling walls formed respectively by the concave recessed wall 24M and by the groove 24F.

The air inlet orifices 74M, 74F open on each side of the optical portion 61. These orifices 74M, 74F are connected to air circulation canals 73M, 73F formed inside these cooling blocks 14M, 14F and which form portions of the primary cooling duct.

This moulding device therefore allows air to be injected into the cooling housings 70 between the surfaces 61', 61" of the optical portion 61 and the cooling portions 24M, 24F and that then allows rapid cooling of the moulded component 60.

According to the invention, as illustrated in this instance in FIG. 19, ejectors 54 may be mounted on or in the rotary structure 8 and on each side of the corresponding cooling block 12M, 14M, 16M. In this instance, these ejectors are mounted in the rotary stage 8.

These ejectors 54 are arranged in such a way as to form additional holding means holding the moulded component 60 via its holding protuberances 62 on the rotary structure 8.

According to the invention, as here, these ejectors 54 are telescopic and can thus deploy out of and in front of the rotary stage 8 so as to facilitate the ejection of the moulded component 60 when it is recovered at the station 6.

Here, the cooling blocks 12M, 12F, 14M, 14F, 16M comprise passageways 75M, 75F for a cooling fluid, such as water, distinct from the air circulation canals 73M, 73F. The connection of the passageways 75M, 75F to the rest of the secondary cooling circuit is achieved on the sides of the cooling blocks 12F, 14F in the case of the fixed mould part F, and on the rear of the cooling block 12M, 14M, 16M in the case of the mobile mould part M. In FIG. 18, it is possible to see on the rear face of the cooling block 14M of the mobile mould part M that the passageways 75M of this block 14M open facing outlets 77M of a line 78M borne by the mobile base 9M. These canals and these lines form the secondary cooling circuit, notably used for circulating water to cool the cooling block 15M.

Although this has not been depicted, the same type of secondary cooling circuit may be arranged in the moulding blocks 11M, 13M, 15M and in the mobile base 9M.

The method for using this mould will now be described.

When a first cycle for forming optical components 60 commences, the mould is closed.

A first injection of material occurs in the first station 1 into the corresponding moulding cavities 21F/21M.

Once the two moulded components 60 have been moulded, as illustrated in FIG. 1, and cooled enough to be demoulded, a step of transferring the two moulded components 60 to a second station 2 is performed.

The first cooling step begins, sending air on each side of the optical portions 61 of the moulded components that form this first layer 66.

Once they have cooled sufficiently so that it is possible to move on to moulding the second layer, a step of transferring the moulded components 60 to a third station 3 is performed.

A second injection of material takes place in the third station 3 inside the corresponding moulding cavities 23F/23M.

Once each moulded component 60 has been moulded at this third station 3, as illustrated in FIG. 2, and has cooled enough to be demoulded, a step of transferring these two moulded components 60 to the fourth station 4 is performed.

The second cooling step begins, sending air over each side of the optical portions 61 of each moulded component illustrated in FIG. 2.

Once they have cooled sufficiently so that it is possible to move on to moulding the third layer, a step of transferring the moulded components 60 to the fifth station 5 is performed.

A third injection of material takes place in the fifth station 5, inside corresponding moulding cavities 25F/25M.

Once each moulded component 60 has been moulded, as illustrated in FIG. 3, and has cooled enough that it can be demoulded, a step of transferring the two moulded components 60 to the sixth station 6 is performed.

The sixth step of cooling begins, sending air over each side of the optical portions 61 of the moulded components illustrated in FIG. 3.

Once they are cooled enough to be ejected, the moulded components 60 are removed from the mould via the ejection opening 27.

A production cycle for producing two moulded components 60 has thus been performed.

Each transfer step is identical here. FIGS. 20a to 20f schematically illustrate a transfer step. Only the position of the moulded components transferred from the second station 2 to the third station 3 is depicted by the reference "60". Of course, at the same time, the moulded components from the other stations are transferred to the next stations (excerpt for those at station 6 which have been removed).

In a first sub-step of the transfer step, the mould is opened in a translational movement along the axis of rotation B, indicated by the arrow illustrated in FIG. 20a, by moving the mobile mould part M away from the fixed mould part F.

In a second sub-step, a translational movement of the rotary stage 8 with respect to the mobile base 9M in a direction parallel to the transfer axis B, which translational movement is indicated by the arrow illustrated in FIG. 20b, is performed until the rotary stage reaches the deployed position illustrated in FIG. 20c. Note that in FIG. 20c, the transfer shaft 10 cannot be seen because it is concealed by the moulding block 13M of the second moulding station 13M. Moreover, for the sake of the clarity of the drawings, only this block 13M has been depicted; the other blocks 11M, 12M, 14M to 16M are not depicted, but also remain fixed to the mobile base 9M.

In a fourth sub-step, the rotary stage 8 is rotated, the moulded components 60 moving on to the next station. FIG. 20c to FIG. 20d represents the passage of the moulded component 60 from the first cooling station 2 to the second moulding station 3.

In a fifth sub-step, the rotary stage 8 is returned towards the mobile base 9M, in the direction of the arrow illustrated in FIG. 20d. The blocks 11M to 16M become inserted in the insertion housings 50.

In a sixth sub-step, the mobile mould part M is returned against the fixed mould part F in a translational movement indicated by the arrow in FIG. 20e. The corresponding cooling blocks 13M and 13F close around the moulded component 60, with their walls some distance away from the optical portion 61. The mould is closed, as illustrated in FIG. 20f. The transfer step is over.

The second cycle is performed with a rotational offset with respect to the first cycle, and so on and so forth each nth cycle being performed at a rotational offset with respect to the previous cycle. In other words, each given cycle begins when the moulded components from the previous cycle have moved on to the second station and ends with the ejection, when the moulded components from the next cycle are in the third moulding station.

The method according to the invention makes it possible to appreciably shorten each cycle:
 by reducing the cooling time, thanks to the injection of a cooling fluid on each side of the moulded component, particularly into a confined cooling space,
 by keeping the moulded components between the mould parts throughout the method,
 in certain embodiments by transferring by rotation.

Note, that ejection may be performed during the mouldings of the various layers so that it is performed in parallel time, thus correspondingly reducing the cycle time required for producing the moulded component.

The invention claimed is:

1. A method for moulding an optical component comprising:
   providing a moulding device comprising:
   a fixed mould part including a base; and
   a mobile mould part including a base and a rotary stage that rotates about an axis of rotation, the mobile mould part being movable translationally relative to the fixed mould part along the axis of rotation so as to open and close the moulding device,
   wherein the rotary stage is movable translationally relative to the base of the mobile mould part along the axis of rotation,
   wherein the fixed mould part and the mobile mould part each includes a moulding block fixed to the base of the fixed mould part and to the base of the mobile mould part, respectively, to present a moulding station, each of the moulding blocks including a moulding impression, the moulding impressions cooperating with each other to form a moulding cavity when the moulding blocks face each other and the moulding device is closed, wherein the fixed mould part and the mobile mould part each includes a cooling block fixed to the base of the fixed mould part and to base of the mobile mould part, respectively, to present a cooling station, the cooling blocks cooperating with each other to form a cooling space when the cooling blocks face each other and the moulding device is closed, and wherein the rotary stage includes insertion openings extending radially about the axis of rotation, the moulding block and the cooling block of the mobile mould part being insertable and slidable inside the insertion openings;

moving the mobile mould part toward the fixed mould part to close the moulding device;

moulding a moulded component in the moulding cavity;

moving the mobile mould part away from the fixed mould part to open the moulding device:

moving the rotary stage away from the base of the mobile mould part along the axis of rotation:

transferring the moulded component from the moulding cavity into the cooling space by rotating the rotary stage, the moulded component being held by the rotary stage:

moving the rotary stage toward the base of the mobile mould part along the axis of rotation:

moving the mobile mould part toward the fixed mould part to close the moulding device; and cooling the moulded component in the cooling space by sending a cooling fluid between the moulded component and the cooling blocks.

2. The method according to claim 1, wherein the moulding device comprises several moulding stations and several cooling stations, each of the moulding stations being formed by a moulding block fixed to the base of the fixed mould part and a moulding block to the base of the mobile mould part, each of the cooling stations being formed by a cooling block fixed to the base of the fixed mould part and a cooling block fixed to the base of the mobile mould part, the method being implemented in such a way as to produce the optical component in several successive layers of one or more materials, each of the layers being obtained in a distinct moulding station of the several moulding stations, transferring the moulded component from the moulding cavity into a distinct cooling station by rotating the rotary stage in which the moulded component is held by the rotary stage, and cooling the moulded component in the cooling space of the distinct cooling station by sending a cooling fluid between the moulded component and the cooling blocks.

3. The method according to claim 1, wherein the moulding station and the cooling station are distributed about the axis of rotation.

4. The method according to claim 1, further comprising removing the moulded component from the moulding device after a final cooling step has been performed at a cooling station at which the final cooling step has taken place.

5. The method according to a claim 1, wherein a first layer of the moulded component is produced in such a way as to form the moulded component with an optical portion and a holding protuberance, and the rotary stage holds the moulded component by the holding protuberance.

6. The according to claim 1, wherein the cooling fluid is injected into the cooling space, on each side of the moulded component, onto the moulded component and in a direction corresponding to an optical axis of the moulded component.

7. A mould for an optical component, comprising:
a fixed mould part including a base; and
a mobile mould part including a base and a rotary stage that rotates about an axis of rotation, the mobile mould part being movable translationally relative to the fixed mould part along the axis of rotation so as to open and close the moulding device, wherein the rotary stage is movable translationally relative to the base of the mobile mould part along the axis of rotation, wherein the fixed mould part and the mobile mould part each includes a moulding block fixed to the base of the fixed mould part and to the base of the mobile mould part, respectively, to present a moulding station, each of the moulding blocks including a moulding impression, the moulding impressions cooperating with each other to form a moulding cavity when the moulding blocks face each other and the moulding device is closed, the moulding station comprising elements for injecting a material into the moulding cavity, wherein the fixed mould part and the mobile mould part each includes a cooling block fixed to the base of the fixed mould part and to base of the mobile mould part, respectively, to present a cooling station, the cooling blocks cooperating with each other to form a cooling space when the cooling blocks face each other and the moulding device is closed, wherein the cooling station comprises holding elements allowing the moulded component to be held some distance from the cooling portions when the mould is closed, and comprises elements for injecting a cooling fluid into the cooling housing, and wherein the rotary stage includes insertion openings extending radially about the axis of rotation, the moulding block and the cooling block of the mobile mould part being insertable and slidable inside the insertion openings.

8. The mould according to claim 7, wherein the mould comprises several moulding stations and several cooling stations, each of the moulding stations being formed by a moulding block fixed to the base of the fixed mould part and a moulding block to the base of the mobile mould part, and each of the cooling stations being formed by a cooling block fixed to the base of the fixed mould part and a cooling block fixed to the base of the mobile mould par.

9. The mould according to claim 8, wherein the mould comprises as many cooling stations as moulding stations.

10. The mould according to claim 8, wherein the moulding stations are arranged in alternation with the cooling stations.

11. The mould according to claim 7, wherein the moulding station and the cooling station are distributed about the axis of rotation.

12. The mould according to claim 7, wherein, at the moulding station comprises a lateral hollow portion extending from the moulding cavity and communicating therewith, so as to allow the moulding station to mould a moulded component with an optical portion and a lateral protuberance which are respectively formed in the moulding cavity and in the lateral hollow portion.

13. The mould according to claim 7, wherein at the cooling stations cooling station, each cooling block comprises a primary cooling duct opening into the cooling space via a cooling orifice formed in the corresponding cooling block, each primary cooling duct being connected to a connector which can be connected to a device for dispatching the cooling fluid.

14. The mould according to claim 7, further comprising an extraction opening on a side of the mould.

\* \* \* \* \*